US007255962B2

(12) United States Patent
Chisholm et al.

(10) Patent No.: US 7,255,962 B2
(45) Date of Patent: Aug. 14, 2007

(54) EULYTITE SOLID ACID ELECTROLYTES FOR ELECTROCHEMICAL DEVICES

(75) Inventors: Calum Chisholm, Pasadena, CA (US); Sossina M. Haile, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/165,560

(22) Filed: Jun. 21, 2005

(65) Prior Publication Data

US 2006/0020070 A1    Jan. 26, 2006

Related U.S. Application Data

(60) Provisional application No. 60/585,251, filed on Jul. 1, 2004.

(51) Int. Cl.
| | |
|---|---|
| *H01M 8/10* | (2006.01) |
| *H01M 2/16* | (2006.01) |
| *C01B 25/37* | (2006.01) |
| *C01B 25/45* | (2006.01) |
| *C01B 25/26* | (2006.01) |
| *C01B 19/00* | (2006.01) |
| *C01B 17/98* | (2006.01) |
| *C01B 33/26* | (2006.01) |
| *C01G 41/00* | (2006.01) |
| *C01G 37/00* | (2006.01) |
| *C01G 31/00* | (2006.01) |
| *C01G 28/00* | (2006.01) |
| *C01G 28/02* | (2006.01) |
| *C01G 17/00* | (2006.01) |

(52) U.S. Cl. ............... 429/129; 423/305; 423/306; 423/307; 423/308; 423/309; 423/311; 423/326; 423/508; 423/512.1; 423/518; 423/592.1; 423/593.1; 423/595; 423/601; 423/602; 423/594.8; 423/594.9; 423/594.13; 429/33

(58) Field of Classification Search ............... 423/305, 423/308, 518, 592.1, 593.1, 595, 601, 602, 423/594.8, 594.9, 594.13, 306, 307, 309, 423/311, 326, 508, 512.1; 429/122, 129, 429/33; 524/406, 414
See application file for complete search history.

(56) References Cited

U.S. PATENT DOCUMENTS 4,137,214 A * 1/1979 Sochalski ............... 523/156

(Continued)

OTHER PUBLICATIONS

Lavrova, et al., "Disordering of Pentacesium Trihydrogen Tetrasulfate in $Cs_5H_3(SO_4)_4$-$SiO_2$ Composite Proto Electrolytes," Inorganic Materials, 2002, vol. 38, No. 11, pp. 1172-1177, no month.

(Continued)

*Primary Examiner*—Wayne A. Langel
(74) *Attorney, Agent, or Firm*—Townsend and Townsend and Crew LLP

(57) ABSTRACT

Improved solid acid electrolyte materials, methods of synthesizing such materials, and electrochemical devices incorporating such materials are provided. The stable electrolyte material comprises a solid acid in a eulytine structure capable of undergoing rotational disorder of oxyanion groups and capable of extended operation at elevated temperatures, that is, solid acids having hydrogen bonded anion groups; a superprotonic disordered phase; and capable of operating at temperatures of ~100° C. and higher.

28 Claims, 2 Drawing Sheets

U.S. PATENT DOCUMENTS

| | | |
|---|---|---|
| 4,365,007 A | 12/1982 | Maru et al. |
| 4,684,581 A | 8/1987 | Struthers |
| 6,051,163 A | 4/2000 | Kumberger et al. |
| 2002/0031695 A1 | 3/2002 | Smotkin |

OTHER PUBLICATIONS

Ponomareva, et al., "Effect of $SiO_2$ morphology and pores size on the proton nanocomposite electrolytes properties," Solid State Ionics, 1999, 119, pp. 295-299, no month.

Ponomareva, et al., "Composite protonic solid electrolytes in $CsHSO_4$-$SiO_2$ system," Solid State Ionics, 1996, 90, pp. 161-166, no month.

Ponomareva, et al., "The influence of heterogeneous dopant porous structure on the properties of protonic solid electrolyte in the $CsHSO_4$-$SiO_2$ system," Solid State Ionics, 1999, 118, pp. 317-323, no month.

Ponomareva, et al., "Composite protonic electrolytes in the system $(NH_4)_3H(SO_4)_2$-$SiO_2$," Solid State Ionics, 2001, 145, pp. 205-210, no month.

Ponomareva, et al., "The investigation of disordered phases in nanocomposite proton electrolytes based on $MeHSO_4$ (Me=Rb,Cs,K)," Solid State Ionics, 2001, 145, pp. 197-204, no month.

* cited by examiner

Evidence of oxygen coordination change within a series of known eulytite compounds.

EULYTITE SOLID ACID ELECTROLYTES FOR ELECTROCHEMICAL DEVICES

CROSS-REFERENCES TO RELATED APPLICATIONS

This application claims benefit of U.S. Provisional Application No. 60/585251, filed Jul. 1, 2004.

STATEMENT AS TO RIGHTS TO INVENTIONS MADE UNDER FEDERALLY SPONSORED RESEARCH OR DEVELOPMENT

A portion of the present invention was made under federally sponsored research and development under Office of Naval Research, Grant No. N00014-02-1-0192. The Government may have rights in certain aspects of this invention.

BACKGROUND OF THE INVENTION

Some electrochemical devices depend on the flow of protons, or the flow of both protons and electrons, through a proton conducting material, such as a membrane. Accordingly, materials which conduct protons, or both protons and electrons, have applications as electrolytes or electrodes in a number of electrochemical devices including fuel cells, hydrogen pumps, supercapacitors, sensors, hydrogen separation membranes and membrane reactors.

One particularly important application for these materials is in fuel cells. Fuel cells are attractive alternatives to combustion engines for power generation, because of their higher efficiency and the lower level of pollutants produced from their operation. There are three common types of fuel cells relevant to this patent: 1) direct hydrogen/air fuel cells, in which hydrogen is stored and then delivered to the fuel cell as needed; 2) indirect hydrogen/air fuel cells, in which hydrogen is generated on site from a hydrocarbon fuel, cleaned of carbon monoxide, and subsequently fed to the fuel cell; and 3) direct alcohol fuel cells, such as methanol ("DMFC"), ethanol, isopropanol and the like, in which an alcohol/water solution is directly supplied to the fuel cell. An example of this later fuel cell was described, for example, in U.S. Pat. No. 5,559,638, the disclosure of which is incorporated herein by reference.

Regardless of the fuel cell design chosen, the operating efficiency of the device is partly limited by the efficiency of the electrolyte at transporting protons. Typically, perfluorinated sulphonic acid polymers, polyhydrocarbon sulfonic polymers, and composites thereof are used as electrolyte membrane materials for fuel cells. However, these conventional materials utilize hydronium ions ($H_3O^+$) to facilitate proton conduction. Accordingly, these materials must be hydrated, and a loss of water immediately results in degradation of the conductivity of the electrolyte and therefore the efficiency of the fuel cell. Moreover, this degradation is irreversible, i.e., a simple reintroduction of water to the system does not restore the conductivity of the electrolyte.

As a result, fuel cells utilizing these materials require peripheral systems to ensure water recirculation and temperature control to keep the water from evaporating. These peripheral systems increase the complexity and cost of these fuel cells, from the use of expensive noble catalysts (Pt) to temperature requirements that cannot exceed much above 100° C. As a result of these temperature limitations, the fuel cell catalysts and other systems cannot be operated to maximum efficiency. Higher temperatures can also reduce carbon monoxide poisoning of the fuel cell catalyst.

It has recently been shown that the solid acids such as $CsHSO_4$ can be used as the electrolyte in fuel cells operated at temperatures of 140-160° C. (Haile, S. M.; Boysen, D. A.; Chisholm, C. R. I.; Merle, R. B. *Nature* 2001, 410, 910-913). Use of this material greatly simplifies fuel cell design relative to polymer electrolyte fuel cells because hydration of the electrolyte is not necessary and, because of the elevated temperature of operation, residual CO in the fuel stream can be better tolerated. The high conductivity of $CsHSO_4$ and analogous materials results from a structural phase transition (referred to as a superprotonic phase transition) that occurs at 141° C. from an ordered structure, based on chains of $SO_4$ groups linked by well-defined hydrogen bonds, to a disordered structure in which $SO_4$ groups freely reorient and easily pass protons between one another. Across this transition, the protonic conductivity increases by 3 to 4 orders of magnitude from $10^{-6}$ $\Omega^{-1}$ $cm^{-1}$ (phase II) to $10^{-3}$-$10^{-2}$ $\Omega^{-1}$ $cm^{-1}$ (phase I; Baranov, A. I.; Shuvalov, L. A.; Shchagina, N. M. *JETP Lett.* 1982, 36(11), 459-462). Thus, disorder in the crystal structure is a key prerequisite for high proton conductivity.

However, the lifetime of these sulfate and selenium based solid acids is insufficient for commercial applications (Merle, R. B.; Chisholm, C. R. I.; Boysen, D. A.; Haile, S. M. *Energy & Fuels* 2003, 17, 210-215). The poor lifetime of both $CsHSO_4$ and $CsHSeO_4$ under fuel cell operating conditions results from the reduction of sulfur and selenium by hydrogen in the presence of typical fuel cell catalysts, according to:

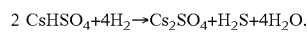
$$2\ CsHSO_4 + 4H_2 \rightarrow Cs_2SO_4 + H_2S + 4H_2O.$$

$$2\ CsHSeO_4 + 4H_2 \rightarrow Cs_2SeO_4 + H_2Se + 4H_2O.$$

Recently, it has been shown that $CsH_2PO_4$ has as superprotonic transition and is stable under fuel cell conditions (Boysen, D. A.; Uda, T.; Chisholm, C. R. I.; Haile, S. M. *Science* 2004, 303, 68-70). To date this is the only known solid acid compound meeting the necessary conditions of long term chemical stability for operation as a fuel cell electrolyte. However, the compound is water soluble and only becomes useful as an electrolyte above its superprotonic phase transition at 230° C. (Baranov, A. I.; Khiznichenko, V. P.; Shuvalov, L. A. *Ferroelectrics* 1989, 100, 135-141). Accordingly, a need exists for solid acid compounds with high proton conductivity over a large range of temperatures that are stable under fuel cell conditions.

BRIEF SUMMARY OF THE INVENTION

The present invention provides solid acid compounds with high proton conductivity over a large range of temperatures. As such, in a first embodiment, the present invention provides compounds of Formula I:

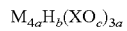
$$M_{4a}H_b(XO_c)_{3a}$$

wherein M is at least one metal each independently a metal cation. X is at least one member each independently selected from the group consisting of P, Si, As, Ge, S, Se, W, Cr and V. In addition, each of subscript a, b and c are independently a non-negative real number.

In another embodiment, the present invention provides compounds of Formula II:

$$M^{2+}_4H(XO_4)_3$$

wherein $M^{2+}$ is a metal cation having a +2 charge.

In yet another embodiment, the present invention provides compounds of Formula III:

$$M^{2+}{}_3M^{3+}H_b(XO_4)_{3-b}(X'O_4)_b$$

wherein $M^{2+}$ is a metal cation having a +2 charge; $M^{3+}$ is a metal cation having a +3 charge; X is a member selected from the group consisting of P, V and As; and X' is a member selected from the group consisting of Si and Ge.

In another embodiment, the present invention provides compounds of Formula IV:

$$M^{1+}{}_bM^{2+}{}_{3-b}M^{3+}H_b(XO_4)_3$$

wherein $M^{1+}$ is a metal cation having a +1 charge; $M^{2+}$ is a metal cation having a +2 charge; and $M^{3+}$ is a metal cation having a +3 charge.

In a further embodiment, the present invention provides compounds of Formula V:

$$M^{1+}{}_bM^{2+}{}_{(4n-1-b)}M^{(2+n)}H_b(XO_4)_{3n}$$

wherein $M^{1+}$ is a metal cation having a +1 charge; $M^{2+}$ is a metal cation having a +2 charge; $M^{(2+n)}$ is a metal cation having a +3, +4 or +5 charge; and subscript n is a non-negative real number.

In still other embodiments, the present invention provides compounds of Formula VI:

$$M^{2+}{}_{(4n-1)}M^{(2+n-b)}H_b(XO_4)_{3n}$$

wherein $M^{2+}$ is a metal cation having a +2 charge; $M^{(2+n-b)}$ is a metal cation having a +3, +4 or +5 charge; and subscript n is a non-negative real number.

In another embodiment, the present invention provides a proton conducting membrane comprising a solid acid of Formula I:

$$M_{4a}H_b(XO_c)_{3a},$$

wherein M is at least one metal each independently a metal cation; X is at least one member each independently selected from the group consisting of P, Si, As, Ge, S, Se, W, Cr and V; and each of subscript a, b and c are independently a non-negative real number.

In a further embodiment, the present invention provides a proton conducting membrane further comprising a structural binder. In other embodiments, the structural binder is a member selected from the group consisting of carbon, polymer, ceramic, glass, semiconductor and metal. In still other embodiments, the structural binder is electrically conducting. In yet other embodiments, the structural binder is a conducting polymer. In another embodiment, the structural binder is a metal. In still another embodiment, the metal structural binder is mixed with a polymer.

In other embodiments, the present invention provides a proton conducting membrane comprising a structural binder that is silicon dioxide. In some other embodiments, the structural binder is quartz. In certain other embodiments, the structural binder is fumed silica or colloidal silica.

In another embodiment, the present invention provides a proton conducting membrane further comprising a separate conducting material. In certain other embodiments, the separate conducting material is ionically conducting.

In a further embodiment, the present invention provides a proton conducting membrane wherein the solid acid includes at least one variable valence element.

In certain other embodiments, the present invention provides a proton conducting membrane being thermally stable at temperatures above about 100° C.

In still other embodiments, the present invention provides a proton conducting membrane having a proton conductivity of about $10^{-5}$ $\Omega^{-1}$ cm$^{-1}$ or higher at the temperature of use.

In another embodiment, the present invention provides a proton conducting membrane conducting both protons and electrons.

In a further embodiment, the present invention provides a method of making a compound of Formula I:

$$M_{4a}H_b(XO_c)_{3a},$$

wherein M is at least one metal each independently a metal cation; X is at least one member each independently selected from the group consisting of P, Si, As, Ge, S, Se, W, Cr and V; each of subscript a, b and c are independently a non-negative real number. A first step of the method involves contacting the metal with a suitable oxyanion and a suitable hydrogen source. A second step involves conducting the method of making under appropriate reaction conditions so as to make a compound of Formula I.

In another embodiment, the present invention provides a method of making a compound of Formula I, further comprising the step of dissolving the metal in a suitable solvent in the presence of a chelating agent.

In other embodiments, the present invention provides a method of making a compound of Formula I, wherein the appropriate reaction conditions are above 500° C. In still other embodiments, the method further comprises the steps of cooling and rehydrating In some embodiments, the present invention provides a method of making a compound of Formula I, wherein the appropriate reaction conditions involve a temperature greater than about 100° C. and a pressure greater than about 1 atm.

In still other embodiments, the present invention provides a method of making a compound of Formula I, wherein the appropriate reaction conditions involve a temperature greater than about 300° C. and a pressure greater than about 10 atm.

These and other embodiments will become more apparent when read with the accompanying figures and detailed description.

BRIEF DESCRIPTION OF THE DRAWINGS

FIG. 1 shows the structure of Ba$_3$La(PO$_4$)$_2$ with circles representing the Ba and La atoms, and polyhedra representing the disordered phosphate groups. The thick white lines represent the potential hydrogen bonds (due to the incorporation of hydrogen into such a structure) with an oxygen to oxygen bond length of 2.73 Å.

FIG. 2 depicts the various types of tetrahedral groups found in eulytite compounds from those with fixed orientations (e.g., Bi$_4$(SiO$_4$)$_3$) to those displaying rotational disorder (e.g., Ba$_3$La(PO$_4$)$_3$).

DETAILED DESCRIPTION OF THE INVENTION

I. Definitions

Figure 1:
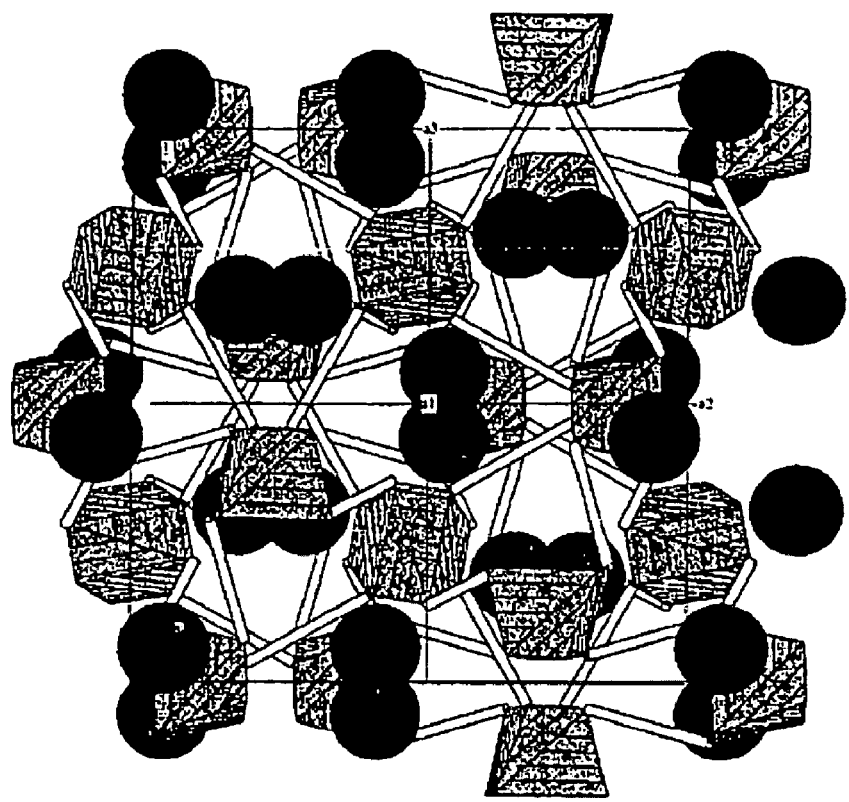
FIG. 1.
Figure 2:
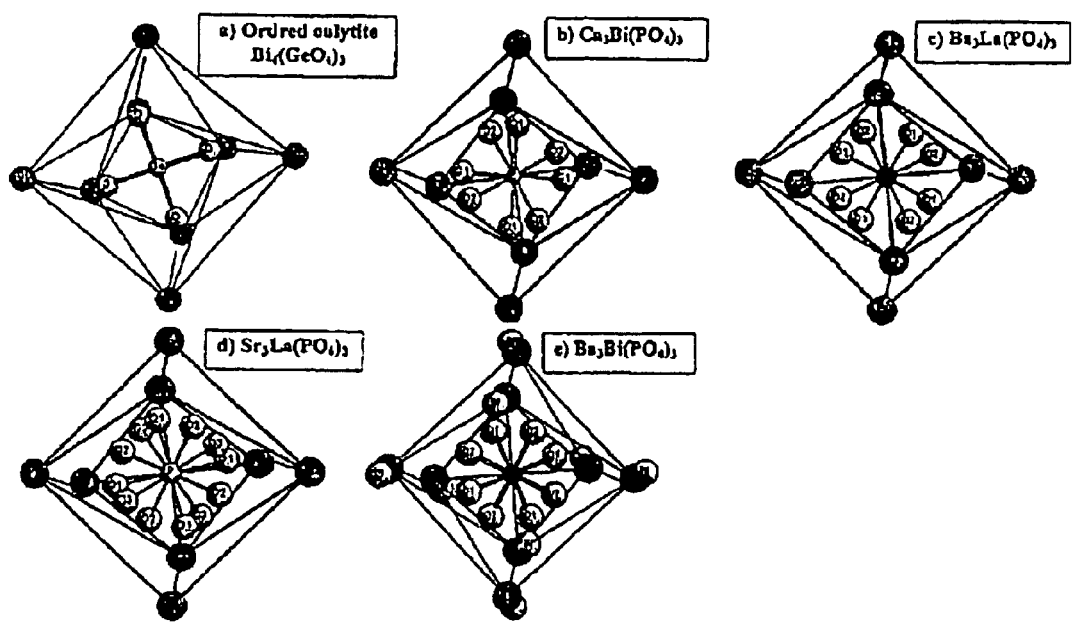
FIG. 2.

As used herein, the term "metal cation" refers to elements of the periodic table that are metallic or semi-metallic and positively charged as a result of having fewer electrons in the valence shell than are present for the neutral metallic element. Metals that are useful in the present invention include the alkali metals, alkaline earth metals, transition metals, the lanthanides, and post-transition metals.

As used herein, the term "proton conducting membrane" refers to a matrix of material that is capable of conducting protons through the matrix. The proton conducting membrane can also conduct electrons. Proton conducting membranes of the present invention are comprised of solid acids of the present invention and, optionally, a material that binds the solid acid together.

As used herein, the term "solid acid" refers to inorganic compounds having a eulytite structure with structural hydrogen, that are superprotonic and have a space group of $I\bar{4}3d$. Solid acids have properties that are intermediate between those of a normal acid, such as, $H_2SO_4$, and a normal salt, such as, $Cs_2SO_4$. Solid acids generally comprise oxyanions, such as, for example, $SO_4$, $SO_3$, $SeO_4$, $SeO_3$, $PO_4$, $PO_3F$, $PO_3H$ $AsO_4$, $SiF_6$ or $AlF_6$ and the like, which are linked together via O—H ●●● H hydrogen bonds. In addition, Known eulytite compounds have the general formula $M_4(XO_4)_3$ (M=Na, K, Rb, Ag, Ba, Sr, Ca, La, Ce, Pr, Bi, Pb, and more; X=Si, Ge, P, As, V, S, Se, Cr) and cubic space group $I\bar{4}3d$. A list of some known eulytite compounds can be found in Table 1. In addition to the types of compounds listed in Table 1, there is evidence of significant solubilities of the different compounds with each other and hence, a large number of intermediate compounds can be synthesized (Perret, R.; Damak, M. *Journal of the Less Common Metals* 1985, 108, 23-34; Kargin, Y. F.; Kargin V. F. *Neorganicheskie Materialy* 1991, 27(3), 563-565; Elouadi, B.; Berrada, A.; Chagraoui, A. *Phase Transitions* 1988, 13, 211-218). In some cases, it has even been reported that the $XO_4$ groups can be replaced by other large anions, such as $I^{-1}$ in the compound $Pb_8(PO_4)_5I$ (Merker, V. L.; Wondratschek, H. *Zeitschrift Fur Kristallographie* 1967, 125(1-6), 266-271).

TABLE 1

List of some known eulytite compounds grouped by general formula.

| $M^{+3}_4(XO_4)_3$ | $M^{+2}_3M^{+3}(XO_4)_3$ | $M^{+1}_xM^{+2}_{3-x}M^{+3}_{1+x}(XO_4)_3$ | $M^{+2}_4(XO_4)_2(ZO_4)$ | $M^{+2}_{4n-1}M^{+(2+n)}(XO_4)_{3n}$ |
|---|---|---|---|---|
| $Bi_4(SiO_4)_3$ | $Ba_3La(PO_4)_3$ | $KBaBi_2(PO_4)_3$ | $Pb_4(PO_4)_2(SO_4)$ | $Ba_7Zr(PO_4)_6$ |
| $Bi_4(GeO_4)_3$ | $Ba_3Bi(PO_4)_3$ | $K_3Bi_5(PO_4)_6$ | $Pb_4(PO_4)_2(CrO_4)$ | $Pb_7Sn(PO_4)_6$ |
| | $Sr_3La(PO_4)_3$ | $RbBaBi_2(PO_4)_3$ | $Ba_4(PO_4)_2(SO_4)$ | $Sr_7Ti(PO_4)_6$ |
| | $Ca_3CC(PO_4)_3$ | $AgPbBi_2(PO_4)_3$ | $Sr_4(PO_4)_2(CrO_4)$ | $Ba_{11}Ta(PO_4)_9$ | they contain cations for overall charge balance. The structure can contain more than one type of oxyanion $XO_4$, $XO_3$ $XO_3A$ or $XF_6$ group, and can also contain more than one type of cation M species.

As used herein, the term "structural binder" refers to a matrix material that enhances the mechanical integrity and/or chemical stability of the proton conducting membrane. Structural binders useful in the present invention include, but are not limited to, carbon, polymer, ceramic, glass, silicon dioxide (e.g., quartz), semiconductor and metal. The structural binder can be electrically conducting or insulating. When the structural binder is electrically conducting it can conduct protons, electrons or both, such that the proton conducting membrane can conduct either protons across the membrane or both protons and electrons across the membrane. Alternatively, the structural binder can be ionically conducting.

As used herein, the term "variable valence element" refers to an element of the periodic table that can adopt one of several different valence states. For example, V typically forms a +4 or a +5 cation. Other variable valence elements include, but are not limited to, P, As, S, Se, W and Cr. Additional variable valence elements include many of the transition metals, post-transition metals and the lanthanides.

As used herein, the term "non-negative real number" refers to any number that is either a positive number or zero.

II. Compounds

The present invention is directed to a stable electrolyte material comprising a solid acid capable of forming hydrogen bonds and undergoing rotational disorder and capable of extended operation at elevated temperatures, specifically, solid acids having a eulytite structure with rotationally disordered tetrahedral anion groups. Such materials are referred to as "solid acid electrolytes" or "electrolytes" herein.

Although several conventional superprotonic solid acid species are discussed above, these materials generally suffer from reduction by hydrogen in the presence of typical fuel cell catalysts, such as, for example, the reduction of $CsHSO_4$ to $H_2S$ according to:

2 $CsHSO_4 + 4H_2 \rightarrow Cs_2SO_4 + H_2S + 4H_2O$.

A similar reduction reaction occurs for $CsHSeO_4$. In addition, many solid acids are water soluble, such as $CsHSO_4$ and $CsHSeO_4$, and thus do not have long lifetimes in the presence of liquid water.

Accordingly, the current invention is directed to improved solid acid compounds that do not suffer from reduction in the presence of catalytic materials such as Pt and other transition metal elements, are non-water soluble, and have high proton conductivity over a large range of temperatures. In particular, some eulytite solid acids are likely to express superprotonic conductivity from (and even below) ambient temperatures to elevated temperatures (up to the dehydration point of the particular compound in question) due to the inherent tetrahedral rotations often found in compounds with the eulytite structure. Also, these solid acid eulytites have limited water solubilities like the known eulytite compounds, and the proven stabilities of $PO_4$, and $SiO_4$ to reduction in the presence of catalytic materials. For example, Applicants have discovered that by replacing the sulfur (or Se) of superprotonic solid acids with elements such as P and Si the reduction reaction can be avoided because analogous reduction compounds such as $H_3P$ and $H_4Si$ are extremely unstable (Merle, R. B.; Chisholm, C. R. I.; Boysen, D. A.; Haile, S. M. *Energy & Fuels* 2003, 17, 210-215; Boysen, D. A.; Uda, T.; Chisholm, C. R. I.; Haile, S. M. *Science* 2004, 303, 68-70).

The compounds of the present invention are solid acids having a eulytite structure with structural hydrogen, are superprotonic and have a space group of $I\bar{4}3d$. As used herein, the term $I\bar{4}$ 3d refers to a body-centered cubic crystal structure having rotoinversion symmetry for every 90° of rotation about the face axis, a three-fold axis of symmetry down the body diagonal, and a diagonal glide with steps of one quarter unit cell edge in each direction. The solid acids of the present invention are compounds whose properties are intermediate between those of a normal acid and a normal salt.

The compounds of the present invention are also those represented by Formula I:

$$M_{4a}H_b(XO_c)_{3a}$$

wherein M is at least one metal each independently a metal cation. X is at least one member each independently selected from the group consisting of P, Si, As, Ge, S, Se, W, Cr and V. In addition, each of subscript a, b and c are independently a non-negative real number.

Metals that are useful in the present invention include the alkali metals, alkaline earth metals, transition metals, the lanthanides, and post-transition metals. Alkali metals include Li, Na, K, Rb and Cs. Alkaline earth metals include Be, Mg, Ca, Sr and Ba. Transition metals include Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg and Ac. The lanthanides include La, Ce, Pr, Nd, Pm, Sm, Eu, Dg, Tb, Dy, Ho, Er, Tm, Yb and Lu. Post-transition metals include Al, Ga, In, Tl, Ge, Sn, Pb, Sb, Bi, and Po. Additional metals include the semi-metals. One of skill in the art will appreciate that many of the metals described above can each adopt several different oxidation states, all of which are useful in the present invention. In some instances, the most stable oxidation state is formed, but other oxidation states are also useful in the present invention. Metal cations useful in the present invention include, but are not limited to, metal cations having a 1+ charge, a 2+ charge, a 3+ charge, a 4+ charge, a 5+ charge and a 6+ charge. Metal cations having other charges are also useful in the present invention. The compounds of the present invention can include more than one type of metal.

Useful elements for the oxyanions of the compounds of the present invention include, but are not limited to, P, Si, As, Ge, S, Se, W, Cr and V. Some of the useful cations of these elements include, but are not limited to, $P^{4+}$, $P^{5+}$, $Si^{4+}$, $As^{5+}$, $Ge^{4+}$, $S^{4+}$, $S^{5+}$, $Se^{4+}$, $Se^{6+}$, $W^{3+}$, $W^{4+}$, $W^{5+}$, $W^{6+}$, $Cr^{6+}$, $V^{4+}$ and $V^{5+}$. One of skill in the art will appreciate that other elements and charge states are also useful for the oxyanions of the present invention.

Oxyanions useful in the present invention include, but are not limited to, $PO_4^{3-}$, $SiO_4^{4-}$, $AsO_4^{3-}$, $GeO_4^{4-}$, $SO_4^{2-}$, $SeO_4^{4-}$, $CrO_4^{2-}$ and $VO_4^{3-}$. The oxyanions are linked together via O—H ●●● H hydrogen bonds. The compounds of the present invention can contain more than one type of oxyanion. One of skill in the art will appreciate that other oxyanions are also useful in the present invention.

In another embodiment, the present invention provides compounds of Formula Ia:

$$M^{1+}{}_aM^{2+}{}_bM^{3+}{}_cM^{4+}{}_dM^{5+}{}_eH_{(3f+4g+2h-a-2b-3c-4d-5g)}(X^{+5}O_4)_f(X^{+4}O_4)_g(X^{+6}O_4)_h$$

wherein each M is a metal cation of the labeled charge state, and each X is a metal cation selected from the group consisting of P, Si, As, Ge, S, Se, W, Cr and V, having the labeled charge state. In addition, each of subscript a, b, c, d, e, f, g and h is a non-negative real number.

In a further embodiment, the present invention provides compounds of Formula II:

$$M^{2+}{}_4H(XO_4)_3$$

wherein $M^{2+}$ is a metal cation having a +2 charge. For example, the compound $Ba_4H(PO_4)_3$ can be thought of as an intermediate to $Ba_3La(PO_4)_3$ and $Ba_4(PO_4)_2(SO_4)$. With the incorporation of hydrogen and the inherent rotation of the $PO_4$ groups, this compound is a preferred solid acid of the present invention.

In some embodiments, the present invention provides compounds of Formula Ia:

$$M^{2+}{}_4H_{(1+a+b)}(X^{+5}O_4)_{(3-a-b)}(X^{+4}O_4)_a(X^{+6}O_4)_b$$

wherein $M^{2+}$ is a metal cation having a +2 charge, and each X is a metal cation selected from the group consisting of P, Si, As, Ge, S, Se, W, Cr and V, having the labeled charge state. In addition, each of subscript a and b is a non-negative real number.

In other embodiments, the present invention provides compounds of Formula III:

$$M^{2+}{}_3M^{3+}H_b(XO_4)_{3-b}(X'O_4)_b$$

wherein $M^{2+}$ is a metal cation having a +2 charge; $M^{3+}$ is a metal cation having a +3 charge; X is a member selected from the group consisting of P, V and As; and X' is a member selected from the group consisting of Si and Ge. For example, the compound $Ba_3BiH(PO_4)_2(SiO_4)$ is an intermediate compound between $Ba_3Bi(PO_4)_2(SiO_4)$ and $Bi_4(SiO_4)_3$. The reduced charge of the $SiO_4$ group (formally, +4 for Si) compared to a $PO_4$ group (formally, +5 for P) requires the incorporation of a proton for charge balance. The presence of protons attached to the rotationally disordered tetrahedra found in the eulytite structure of $Ba_3Bi(PO_4)_3$, results in superprotonic conduction of the protons through the crystalline structure of the compound.

In another embodiment, the present invention provides compounds of Formula IV:

$$M^{1+}{}_bM^{2+}{}_{3-b}M^{3+}H_b(XO_4)_3$$

wherein $M^{1+}$ is a metal cation having a +1 charge; $M^{2+}$ is a metal cation having a +2 charge; and $M^{3+}$ is a metal cation having a +3 charge. For example, the compound $KBa_2BiH(PO_4)_3$ is an intermediate compound between $KBaBi_2(PO_4)_3$ and $Ba_3Bi(PO_4)_3$. Superprotonic conductivity arises due to the presence of protons attached to the rotationally disordered tetrahedra of the compound.

In still other embodiments, the present invention provides compounds of Formula IVa:

$$M^{1+}{}_aM^{2+}{}_{(4-a-b)}M^{3+}{}_bH_{(1+a+b+c-d)}(X^{+5}O_4)_{(3-c-d)}(X^{+4}O_4)_c(X^{+6}O_4)_d$$

wherein each M is a metal cation of the labeled charge state, and each X is a metal cation selected from the group consisting of P, Si, As, Ge, S, Se, W, Cr and V, having the labeled charge state. In addition, each of subscript a, b, c and d are independently a non-negative real number.

In a further embodiment, the present invention provides compounds of Formula V:

$$M^{1+}{}_bM^{2+}{}_{(4n-1-b)}M^{(2+n)}H_b(XO_4)_{3n}$$

wherein $M^{1+}$ is a metal cation having a +1 charge; $M^{2+}$ is a metal cation having a +2 charge; $M^{(2+n)}$ is a metal cation having a +3, +4 or +5 charge; and subscript n is a nonnegative real number. For example, the compound $KBa_6ZrH(PO_4)_6$, because of the incorporation of hydrogen in to the eulytite structure (with its inherent rotations of the $PO_4$ groups) is another preferred compound for expressing superprotonic conductivity.

In another embodiment, the present invention provides compounds of Formula Va:

$$M^{1+}{}_b M^{2+}{}_{(4n-1-b)} M^{(2+n)} H_{(b+c*n-d*n)} (X^{+5}O_4)_{(3-c-d)*n} (X^{+4}O_4)_{c*n} (X^{+6}O_4)_{d*n}$$

wherein each M is a metal cation of the labeled charge state, and each X is a metal cation selected from the group consisting of P, Si, As, Ge, S, Se, W, Cr and V, having the labeled charge state. In addition, each of subscript b, c, d and n are independently a non-negative real number.

In still other embodiments, the present invention provides compounds of Formula VI:

$$M^{2+}{}_{(4n-1)} M^{(2+n-b)} H_b (XO_4)_{3n}$$

wherein $M^{2+}$ is a metal cation having a +2 charge; $M^{(2+n-b)}$ is a metal cation having a +3, +4 or +5 charge; and subscript n is a non-negative real number. For example, the known compound $Ba_7Sn^{+4}(PO_4)_6$ can have the $Sn^{+4}$ atoms reduced, in the presence of a hydrogen containing atmosphere, to $Sn^{+2}$ atoms. Hydrogen is then simultaneously incorporated in to the eulytite structure (creating $Ba_7Sn^{+2}H_2(PO_4)_6$) for charge balance. The combination of the inherent rotations of the $PO_4$ groups in this eulytite structure and the presence of acid protons effectuate superprotonic conductivity.

In a further embodiment, the present invention provides compounds of Formula VIa:

$$M^{2+}{}_{(4n-1)} M^{(2+n+b)} H_{(b+c*n-d*n)} (X^{+5}O_4)_{(3-c-d)*n} (X^{+4}O_4)_{c*n} (X^{+6}O_4)_{d*n}$$

wherein each M is a metal cation of the labeled charge state, and each X is a metal cation selected from the group consisting of P, Si, As, Ge, S, Se, W, Cr and V, having the labeled charge state. In addition, each of subscript b, c, d and n are independently a non-negative real number.

In yet another embodiment, the compounds of the present invention are selected from the group consisting of $M^{2+}{}_4H(XO_4)_3$, $M^{2+}{}_3M^{3+}H_b(XO_4)_{3-b}(X'O_4)_b$, $M^{1+}{}_bM^{2+}{}_{3-b}M^{3+}H_b(XO_4)_3$, $M^{1+}{}_bM^{2+}{}_{(4n-1-b)}M^{(2+n)}H_b(XO_4)_3n$ and $M^{2+}{}_{(4n-1)}M^{(2+n-b)}H_b(XO_4)_{3n}$, wherein $M^{1+}$ is a metal cation having a +1 charge; $M^{2+}$ is a metal cation having a +2 charge; $M^{3+}$ is a metal cation having a +3 charge; $M^{(2+n)}$ is a metal cation having a +3, +4 or +5 charge; $M^{(2+n-b)}$ is a metal cation having a +3, +4 or +5 charge; and subscripts b and n are each independently a non-negative real number.

Furthermore, any combination of the above examples have superprotonic conductivity over a large temperature range and are water insoluble. In all cases listed above, the 4:3, cation to anion ratio of the eulytite structure (corresponding to $M_4(XO_4)_3$, i.e., the general formula) is maintained, while the hydrogen atoms are incorporated into the structure for charge neutrality. In general, as long as the 4:3, metal cation to anion ratio of the eulytite structure is maintained, the incorporation of the appropriate amount of protons into the structure is possible. Therefore, the most general formula for superprotonic solid acid eulytites simply maintains an overall ratio of 4:3 for the number of metal cations to number of anions in the structure, regardless of the exact stoichiometry, with some amount of stoichiometric hydrogen incorporated into the crystal structure. This generalization also applies to non-homogenous tetrahedral anions such as $PO_3F$, $PO_3H$, $AsO_3F$, $SiO_3F$, and the like, as well as non-tetrahedral anions that might be in the eulytite structure (such as $I^{-1}$ in the compound $Pb_8(PO_4)_5I$). Moreover, the cations need not be individual atoms such as K, Ba, or Bi, but can equally be $NH_4^+$, or other small molecules. As long as the eulytite structure is maintained (with the inherent rotations of the oxyanions) and protons are incorporated into the crystalline structure, all such compounds exhibit superprotonic conductivity.

III. Proton Conducting Membranes

In some embodiments, the proton conducting membranes of the present invention comprise a solid acid of Formula I:

$$M_{4a} H_b (XO_c)_{3a},$$

wherein M is at least one metal each independently a metal cation; X is at least one member each independently selected from the group consisting of P, Si, As, Ge, S, Se, W, Cr and V; and each of subscript a, b and c are independently a non-negative real number.

In other embodiments, the present invention provides proton conducting membranes comprising a solid acid of Formula II, IIa, III, IV, IVa, V, Va, VI or VIa.

A. Membrane Properties

Solid acids have certain characteristics that can be advantageous when used as a proton conducting membrane. The proton transport process does not rely on the motion of hydronium ions, thus solid acids need not be humidified and their conductivity is substantially independent of humidity. Another advantage is that solid acids are generally stable against thermal decomposition at elevated temperatures. The thermal decomposition temperature for some of the solid acids described in this specification can be as high as 35° C.

Since solid acids need not be humidified, solid acid based membranes can be operated at elevated temperatures, e.g. temperatures above 100° C.

The conductivity of solid acids can be purely protonic, or both electronic and protonic depending on the choice of the cation in the oxyanion. That is, by using a given amount of a variable valence element such as Cr or Mn, the solid acid can be made to conduct electrons as well as protons.

Another advantage is caused by the structure of the solid acids themselves. Since solid acids are dense, inorganic materials, they are impermeable to gases and other fluids that can be present in the electrochemical environment, e.g., gases and hydrocarbon liquids.

This combination of properties: good conductivity in dry environments, conductivity that can be controlled to be either purely proton conducting or both electron and proton conducting, impermeability to gases and hydrocarbon liquids, serviceability at elevated temperatures, e.g. temperatures over 100° C., and relatively low cost, render solid acids as useful materials for use as membranes in electrochemical devices.

Solid acids exhibit another advantageous property for applications in proton conducting membranes. Under certain conditions of temperature and pressure, the crystal structure of a solid acid can become disordered. Concomitant with this disorder is a high conductivity, as high as $10^{-3}$ to $10^{-2}$ $\Omega^{-1}$ cm$^{-1}$. Because of the high proton conductivity of the structurally disordered state, it is known as a superprotonic phase. The proton transport is believed to be facilitated by rapid $XO_4$ or $XO_3$ group reorientations, which occur because of the disorder.

Many solid acids enter a superprotonic state at a temperature between about 50 and about 250° C. at ambient pressures. The transition into the superprotonic phase can be either sharp or gradual. The superprotonic phase is marked by an increase in conductivity, often by several orders of magnitude. At temperatures above the transition temperature, the solid acid is superprotonic and retains its high proton conductivity until the decomposition or melting temperature is reached. The solid acids of the present invention can also be operated at a temperature above the superprotonic transition temperature, and below the decomposition or melt temperature.

B. Structural Binders

In certain embodiments, the present invention provides a composite comprised of a solid acid embedded in a supporting matrix such as a structural binder. The solid acid part of the composite provides the desired electrochemical activity, whereas the matrix provides mechanical support and increases chemical stability.

In another embodiment, the present invention further comprises a structural binder. Structural binders useful in the present invention include, but are not limited to, carbon, polymer, ceramic, glass, silicon dioxide, semiconductor and metal. In some embodiments, the structural binder is electrically conducting. When the structural binder is electrically conducting, the structural binder can be a conducting polymer, conducting ceramic, semiconductor or a metal. Alternatively, when the structural binder is a ceramic, semiconductor or metal, it can be mixed with a polymer. In other embodiments, the structural binder is silicon dioxide. In still further embodiments, the structural binder is quartz. In certain other embodiments, the structural binder is fumed silica or colloidal silica.

When the structural binder is carbon, the structural binder can be graphite, carbon black, carbon nanotubes, and the like. In addition, combinations of the different types of carbon (i.e., carbon black and carbon nanotubes or graphite and carbon nanotubes, for example) are useful as a structural binder of the present invention. One of skill in the art will appreciate that other carbon forms are useful in the present invention.

When the structural binder is silicon dioxide, the structural binder can be quartz, fumed silica, colloidal silica, and the like. One of skill in the art will appreciate that other silicon dioxide structural binders are useful in the present invention.

When the structural binder is a polymer, the structural binder can be electrically conducting or insulating. Electrically conducting polymers include, but are not limited to, poly(vinylpyridine), poly(pyrrole), poly(phenylenevinylene), poly(thiophene), poly(acetylene) and the like. Additional polymers useful in the present invention include high melt temperature thermoplastic or thermoset fluoropolymers (Teflon, TFE, PFA, FEP, Tefzel, Kalrez, and Viton), or high melt temperature polymers (PBI, PES, PMR-15 polyimide matrix resin, EVA, and "nylons" such as PA-6 and PA-6,6). The structural binder can comprise either an electrically conducting polymer, an insulating polymer, or some combination of both. One of skill in the art will appreciate that other types of electrically conducting and insulating polymers are useful in the present invention.

When the structural binder is a metal, the structural binder can be any metal, metal oxide, metal salt, or metal complex using a metal such as those described above. The structural binder can include more than one metal element, and can also incorporate non-metal species in the structural binder.

When the structural binder is a ceramic, the structural binder can be any ceramic stable under fuel cell conditions such as, but not limited to, zirconia ($ZrO_2$), alumina ($Al_2O_3$), titanium dioxide ($TiO_2$), or ceria ($CeO_2$). The structural binder can include more than one ceramic material, as well as non-ceramic species. One of skill in the art will appreciate that other ceramics are useful in the present invention.

When the structural binder is a semiconductor, the structural binder can be any semiconductor stable under fuel cell conditions such as, but not limited to, silicon (Si), silicon carbide (SiC), germanium (Ge), carbon (C, in diamond form), zinc-selenide (ZnSe), gallium-arsenide (GaAs), gallium-nitride (GaN), and indium-phosphide (InP). The structural binder can include more than one semiconductor material, as well as non-semiconductor species. One of skill in the art will appreciate that other semiconductors are useful in the present invention.

In some other embodiments, the present invention provides a proton conducting membrane further comprising a separate conducting material. Separate conducting materials useful in the present invention include, but are not limited to, carbon, polymers, ceramics and metals, as described above. In certain other embodiments, the separate conducting material is ionically conducting. Separate conducting materials useful in the current invention include ionically conductive materials such as, but not limited to, scandium doped ceria (SDC, oxygen ion conductor), yttrium stabilized zirconium (YSZ, oxygen ion conductor), and perovskites (e.g., $BaZrO_3$ and $BaCeO_3$, proton and oxygen ion conductors, respectively). More than one separate conducting material can be used in the structural binders of the present invention. One of skill in the art will appreciate that other conducting materials are also useful in the present invention.

In still other embodiments, the present invention provides a proton conducting membrane comprising a solid acid that includes at least one variable valence element.

In a further embodiment, the present invention provides a proton conducting membrane being thermally stable at temperatures above about 100° C. In other embodiments, the proton conducting membrane has a proton conductivity of about $10^{-5}$ $\Omega^{-1}$ $cm^{-1}$ or higher at the temperature of use. In another embodiment, the proton conducting membrane can conduct both protons and electrons. In still another embodiment, the present invention provides a proton conducting membrane comprising additional types of solid acids.

Accordingly, in some embodiments the present invention provides a composite material comprised of a solid acid embedded in a supporting matrix and operated at a slightly elevated temperature. In such a composite, the solid acid is in its superprotonic phase, exhibits high conductivity, and provides the desired electrochemical functions; the support matrix can provide mechanical support, and it can also serve to protect the solid acid from water in the environment. A high temperature of operation can render the solid acid into its superprotonic state. A high temperature of operation can also ensure that any water present in the electrochemical device will be present in the form of steam rather than liquid water, making the $H_2O$ less likely to attack the solid acid.

C. Applications of Proton Conducting Membranes

The compounds and proton conducting membranes of the present invention are useful in hydrogen/air fuel cells, direct alcohol fuel cells, hydrogen separation membranes and membrane reactors. Other useful applications of the compounds and proton conducting membranes of the present invention will be apparent to one of skill in the art.

1. Hydrogen/Air Fuel Cells

A hydrogen/air fuel cell is one in which the proton conducting membrane is a solid acid/matrix composite of the type described herein. Because the membrane need not be humidified, the fuel cell system can be simpler than one which uses a hydrated polymer membrane. The humidification system normally required for fuel cell utilizing a Nafion or related polymer membrane can be eliminated. Hence, less rigid temperature monitoring and control can be used in the solid acid based system as compared with Nafion based fuel cell systems. These differences allow a more efficient cell system.

In certain embodiments, the proton conducting membranes of the present invention have a partial pressure of water of less than 1. In other embodiments, the proton conducting membranes of the present invention have water on the surface of the membrane, but not in the interior of the membrane.

Because the membrane need not be humidified, the hydrogen/air fuel cell can be operated at temperatures above 100° C. The tolerance of the Pt/Ru catalysts to carbon monoxide CO poisoning increases with increasing temperature. Thus, a fuel cell of the instant invention, operated at a temperature above 100° C. can withstand higher concentrations of CO in the hydrogen fuel than a Nafion based fuel cell which is typically operated at a temperature lower than 100° C.

The high temperature of operation also enhances the kinetics of the electrochemical reactions, and can thereby result in a fuel cell with higher overall efficiency than one based on Nafion or other hydrated polymers.

2. Direct Alcohol Fuel Cells

A direct alcohol fuel cell is constructed using a proton conducting membrane comprising a solid acid/matrix composite of the type described herein. Useful alcohols include methanol, ethanol, isopropanol, and the like. Because the membrane need not be humidified, the fuel cell system is much simpler and thus less costly than state of the art direct alcohol fuel cell systems. The humidification system normally required for fuel cell utilizing a Nafion or related polymer membrane is eliminated. Furthermore, temperature monitoring and control in the solid acid based system does not need to be as tight as in Nafion based fuel cell systems. Because the solid acid based membrane need not be humidified, the fuel cell can be operated at elevated temperatures. High temperatures can enhance the kinetics of the electrochemical reactions. This results in a fuel cell with very high efficiency.

Another significant advantage of the fuel cell of the instant invention over state of the art direct alcohol fuel cells results from the decreased permeability of the membrane to alcohol. In state of the art direct alcohol fuel cells, in which Nafion or another hydrated polymer serves as the membrane, alcohol crossover through the polymeric membrane lowers fuel cell efficiencies. The impermeability of a solid acid membrane can improve this efficiency.

3. Hydrogen Separation Membranes

The Ru/Pt catalyst in a hydrogen/air fuel cell is sensitive to CO poisoning, particularly at temperatures close to ambient. Therefore, in an indirect hydrogen/air fuel cell, the hydrogen produced by the reformer is often cleaned, of e.g. CO to below 50 ppm, before it enters the fuel cell for electrochemical reaction.

The hydrogen separation membrane contemplated by the instant invention can be made of a mixed proton and electron conducting membrane, as described herein. Hydrogen gas, mixed with other undesirable gases, is introduced onto one side of the membrane. Clean hydrogen gas is extracted from the other side of the membrane.

On the inlet side of the membrane, hydrogen gas is dissociated into $H^+$ and $e^-$. When the membrane is both proton conducting and electron conducting, both of these species can migrate through the membrane. However, the membrane is substantially impermeable to other gases and fluids. Hence, CO and other undesirable gases or fluids cannot so migrate. On the outlet side of the membrane, the $H^+$ and $e^-$ recombine to form hydrogen gas. The overall process is driven by the hydrogen chemical potential gradient, which is high on the inlet side of the membrane and low on the outlet side of the membrane.

Another type of hydrogen separation membrane uses a membrane made of a proton conducting composite of the type described herein, and is connected to a current source. Hydrogen gas, mixed with other undesirable gases, is introduced onto one side of the membrane and clean hydrogen gas is extracted from the other side of the membrane. Application of a current causes the hydrogen gas to dissociate into $H^+$ and $e^-$. As the membrane conducts only protons, these protons are the only species which can migrate through the membrane. The electrons migrate through the current source to the outlet side of the membrane, where the $H^+$ and $e^-$ recombine to form hydrogen gas. The membrane is substantially impervious to other gases and fluids. Hence, CO and other undesirable gases or fluids cannot migrate through the proton conducting membrane. The overall process is driven by electric current applied via the current source.

4. Membrane Reactors

Additional devices incorporating the proton conducting membranes of the present invention include membrane reactors, in which a mixed proton and electron conducting membrane of the type described herein is utilized. The general reaction is that reactants A+B react to form products C+D, where D is hydrogen gas. Use of a mixed proton and electron conducting membrane in this reactor can enhance the reaction to give yields that exceed thermodynamic equilibrium values. On the inlet side of the membrane reactor, the reactants form products $C+H_2$. Under equilibrium conditions, the hydrogen concentration builds up and the forward reaction is slowed. With the use of the mixed hydrogen and electron conducting membrane, the hydrogen is immediately extracted from the reaction region via transport through the membrane, and the forward reaction is enhanced. Examples of reactions in which yield can be enhanced by using such a membrane reactor include (1) the steam reformation of methane (natural gas) to produce syngas: $CH_4+H_2O \rightarrow CO+3H_2$; (2) the steam reformation of CO to produce $CO_2$ and $H_2$: $CO+H_2O \rightarrow CO_2+H_2$; (3) the decomposition of $H_2S$ to $H_2$ and S, (4) the decomposition of $NH_3$ to $H_2$ and $N_2$; (4) the dehydrogenation of propane to polypropylene; and (5) the dehydrogenation of alkanes and aromatic compounds to various products.

A second type of membrane reaction is one utilizing a mixed proton and electron conducting membrane of the type described herein. In this case, the general reaction is that the reactants A+B form the products C+D, where B is hydrogen. The hydrogen enters the reaction region via transport through the mixed conducting membrane, whereas the reactant A is introduced at the inlet to the membrane reactor, and is mixed with other species. The manner in which the hydrogen is introduced into the reactant stream (through the membrane) ensures that only the reactant A, and none of the other species reacts with hydrogen. This effect is termed selective hydrogenation.

A third type of membrane reaction is one utilizing only a proton conducting membrane of the type described herein. In this case, the general reaction is that the reactants A+B form the product C, where B is hydrogen. The hydrogen enters from the "anode" side of the membrane reactor and is conducted to the reaction region via transport through the proton conducting membrane, whereas the reactant A is introduced on the "cathode" side of the membrane reactor, and is "hydrogenated" at the cathode surface to form the reactant, C. The reactant A may be mixed with other species. The manner in which the hydrogen is introduced into the reactant stream (through the membrane) ensures that only the reactant A, and none of the other species, reacts with hydrogen. This effect is termed selective hydrogenation. For example, ethylene can be hydrogenated to ethane by such a process using such a membrane: $C_2H_4+H_2 \rightarrow C_2H_6$.

The mixed proton and electron conducting membranes described herein provide an advantage over state-of-the-art membranes in that the conductivity is high at temperatures as low as 100° C., and the membranes are relatively inexpensive. Selective hydrogenation at temperatures close to ambient can have particular application in synthesis of pharmaceutically important compounds which cannot withstand high temperatures.

D. Preparation of Proton Conducting Membranes

The proton conducting membranes of the present invention can be prepared by a variety of means. One method involves mechanically pressing an evenly dispersed layer of solid acid into a highly dense layer supported on the anode and/or cathode layers. The solid acid layer can be compressed at temperatures ranging from ambient to above the melt temperature of the solid acid. Another method involves mixing the solid acid with a supporting structure that is electrochemically unreactive, to form a composite. A first embodiment uses a solid acid mixed with a melt-processable polymer as the supporting matrix structure. Composite membranes of the solid acid and poly(vinylidene fluoride) can prepared by simple melt-processing methods. The two components can be lightly ground together then hot-pressed at 180° C. and 10 kpsi for 15 minutes. One of skill in the art will appreciate that additional melt-processable polymers are useful in the present invention, such as those described herein as polymer binders.

Additional methods include mixing a thermoset polymer in with the solid acid in monomer or prepolymer form, and then polymerizing in situ. Composite membranes of the solid acid and the polyester resin marketed under the name Castoglas by Buehler, Inc. can be synthesized simply by lightly grinding the solid acid and pre-polymer together and then adding the polymerization/crosslinking catalyst.

The thermoset polymer can also be poly(dicyclopentadiene) or poly DCPD. In such cases, the solid acid is ground and then mixed with the monomer dicyclopentadiene. The polymerization catalyst is introduced into the mixture, which is then poured onto a Teflon plate and pressed into a thin film. The film is cured at 100° C. for approximately 2 hours. One of skill in the art will appreciate that additional thermoset polymers are useful in the present invention.

Another method for preparing solid acid/polymer composites is suspension coating. For this, the solid acid is dissolved in a water/ethanol solution, and the polymer PTFE is dispersed into this solution. A composite membrane is formed by casting the suspension, allowing the solvents to evaporate, and then mechanically pressing at either ambient or elevated temperatures.

When the structural binder is non-polymeric (such as ceramic, glass, or carbon), the solid acid is synthesized from aqueous solution and the matrix material is synthesized separately. The two components are then mixed and ground together. The mixture is then pressed at either ambient or elevated temperatures, preferably at an elevated temperature which causes the solid acid and/or polymer to melt and flow, to yield a dense composite membrane.

Electrically conductive composites are prepared by combining at least one solid acid and an electrically conductive structural binder. The electrically conductive structural binder can be an electronically conducting polymer, such as poly(aniline) or poly(imidazole), or a typical metal, such as aluminum or copper, as well as a conductive carbon material. Where the electronically conducting component is a metal, it can be advantageous to introduce a chemically and electrically inert polymer into the composite simply to serve as a binder and provide the membrane with good mechanical properties. The processing methods described above can be used to prepare such composite membranes.

Electrically conductive composites can also be prepared by performing direct chemical substitutions with variable valence ions. Substitution in the oxyanion or metal cation component with a variable valence element can provide the desired electronic conductivity. Large ions with variable valence, such as thallium, indium, lead and tin can be used for these substitutions. The solid acid so modified can be used in an electrochemical device directly, or can be combined with a supporting matrix material as described above.

One of skill in the art will appreciate that other methods exist for preparing the membranes of the present invention.

IV. Methods of Making the Compounds

Synthesis routes to superprotonic eulytite solid acids include, but are not limited to: hydrothermal methods, melt processing, high pressure/temperature methods, single crystal growth from phosphate and silicate gels, ion exchange procedures, and solid state synthesis followed by reduction/incorporation of hydrogen.

In certain embodiments, the present invention provides a method of making a compound of Formula I:

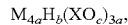

$$M_{4a}H_b(XO_c)_{3a},$$

wherein M is at least one metal each independently a metal cation; X is at least one member each independently selected from the group consisting of P, Si, As, Ge, S, Se, W, Cr and V; each of subscript a, b and c are independently a nonnegative real number. A first step of the method involves contacting the metal with a suitable oxyanion and a suitable hydrogen source. A second step involves conducting the method of making under appropriate reaction conditions so as to make a compound of Formula I.

For example, the compound $Ba_4H(PO_4)_3$ can be synthesized by hydrothermal methods starting with $Ba(OH)_2$ and $H_3PO_4$ and $H_2O$ mixed in a particular ratio and placed in a pressure vessel (i.e. thermal bomb). In addition, the compound $Ba_4H(PO_4)_3$ can be synthesized by reacting $BaHPO_4$ and $Ba_3(PO_4)_2$ together under high isostatic pressures and temperatures, where the melt of $BaHPO_4$ is stable.

The compound $Ba_3BiH(PO_4)_2(SiO_4)$ can be prepared by gelation of a phosphate/silicate gel with precipitation of the compound (typically in the form of single crystals) from the gel when a barium/bismuth solution is placed in contact with the surface of the gel. Furthermore, $Ba_3BiH(PO_4)_2(SiO_4)$ can be synthesized by first making the precursor $Ba_2Bi_2(PO_4)_2(SiO_4)$ by solid state methods. The protonated compound can then be made by exchanging $Bi^{+3}$ for $Ba^{+2}$ plus $H^+$ (in an ion exchange column for example).

In another synthesis route, the compound $Ba_7Sn^{+4}(PO_4)_6$ can be synthesized by reported solid state methods (Merker, V. L.; Wondratschek, H. *Zeitschrift Fur Kristallographie* 1967, 125(1-6), 266-271), and then reduced at sufficiently elevated temperatures under a hydrogen atmosphere. Upon slow cooling of the sample, the compound $Ba_7Sn^{+2}H_2(PO_4)_6$ can be synthesized. This compound can have stability in oxygen containing atmospheres to elevated temperatures, as has been shown in similar compounds (Lazoryak, B. I.;

Khan, N.; Morozov, V. A.; Belik, A. A.; Khasanov, S. S. *Journal of Solid State Chemistry* 1999, 145, 345-355).

In another embodiment, the present invention provides a method of making a compound of Formula I, further comprising the step of dissolving the metal in a suitable solvent in the presence of a chelating agent.

In other embodiments, the present invention provides a method of making a compound of Formula I, wherein the appropriate reaction conditions are above 500° C. In still other embodiments, the method further comprises the steps of cooling and rehydrating. The step of cooling involves cooling the mixture to a temperature of between about 25° C. to about 400° C. The step of rehydrating involves adding water to the mixture in a pressurized container with a pressure from about 1 atm to about 100 atm. The steps of cooling and rehydrating can be performed separately or concurrently. One of skill in the art will appreciate that other temperatures and pressures are useful in the cooling and rehydrating steps of the present invention.

In some embodiments, the present invention provides a method of making a compound of Formula I, wherein the appropriate reaction conditions involve a temperature greater than about 100° C. and a pressure greater than about 1 atm.

In still other embodiments, the present invention provides a method of making a compound of Formula I, wherein the appropriate reaction conditions involve a temperature greater than about 300° C. and a pressure greater than about 10 atm.

V. EXAMPLES

Example 1

Preparation of $Ba_4H(PO_4)_3$

The compound $Ba_4H(PO_4)_3$ is synthesized by hydrothermal methods starting with $Ba(OH)_2$ and $H_3PO_4$ and $H_2O$ mixed in a 4:3:20 mole ratio and 5 g of the mixture placed in a pressure vessel (i.e. thermal bomb) of volume 20 ml. The pressure vessel is then heated up to 250° C. and held there for 48 hrs. The pressure vessel is then cooled and the protonated $Ba_4H(PO_4)_3$ compound filtered in DI water and dried.

Example 2

Preparation of $Ba_4H(PO_4)_3$

The compound $Ba_4H(PO_4)_3$ is synthesized by reacting $BaHPO_4$ and $Ba_3(PO_4)_2$ together under a pressure of 10 MPa in a sealed platinum ampoule at a temperature of 500° C. The mixture is held at such a temperature and pressure for 24 hrs and then slowly cooled at 5° C./min to room temperature. The resulting crystals are filtered with DI water and dried.

Example 3

Preparation of $Ba_4H(PO_4)_3$

The compound $Ba_4H(PO_4)_3$ is synthesized by reacting a 5 g of a 0.2 M barium acetate solution (buffered with HCl to give a pH of 3) with 60 g of a 0.01 M $H_3PO_4$ solution. The mixture of solutions is stirred for 1 hr and let to sit for 48 hrs at room temperature. A barium-phosphate gel forms within the first 5 hrs and then crystallizes over the remaining 43 hrs. The rate of crystallization and overall yield can be increased by increasing the rest temperature of the mixed solution, but the crystallinity of the resulting powder decreases with increasing rest temperature.

Example 4

Preparation of $Ba_4H(PO_4)_3$

The compound $Ba_4H(PO_4)_3$ is synthesized by mechanically grinding $BaCO_3$ and $(NH_4)_2HPO_4$ in a 4:3 ratio, heating the mixture to 400° C. for 24 hrs. Ten grams of the dehydrated mixture is then rehydrated in a 100 ml pressure vessel containing 2 ml of water by sealing the pressure vessel (with the powder and water inside) and heating it to 180° C. for 24 hrs. The product is then washed in DI water and dried.

Although the foregoing invention has been described in some detail by way of illustration and example for purposes of clarity of understanding, one of skill in the art will appreciate that certain changes and modifications can be practiced within the scope of the appended claims. In addition, each reference provided herein is incorporated by reference in its entirety to the same extent as if each reference was individually incorporated by reference.

What is claimed is:

1. A compound of Formula I:

$$M_{4a}H_b(XO_c)_{3a},$$

wherein

M is at least one metal each independently a metal cation;

X is at least one member each independently selected from the group consisting of P, Si, As, Ge, S, Se, W, Cr and V; and each of subscript a, b and c are independently a positive real number.

2. The compound of claim 1, having Formula II:

$$M^{2+}_4H(XO_4)_3$$

wherein $M^{2+}$ is a metal cation having a +2 charge.

3. The compound of claim 1, having Formula III:

$$M^{2+}_3M^{3+}H_b(XO_4)_{3-b}(X'O_4)_b$$

wherein $M^{2+}$ is a metal cation having a +2 charge;

$M^{3+}$ is a metal cation having a +3 charge;

X is a member selected from the group consisting of P, V and As; and

X' is a member selected from the group consisting of Si and Ge.

4. The compound of claim 1, having Formula IV:

$$M^{1+}_bM^{2+}_{3-b}M^{3+}H_b(XO_4)_3$$

wherein $M^{1+}$ is a metal cation having a +1 charge;

$M^{2+}$ is a metal cation having a +2 charge; and $M^{3+}$ is a metal cation having a +3 charge.

5. The compound of claim 1, having Formula V:

$$M^{1+}_bM^{2+}_{(4n-1-b)}M^{(2+n)}H_b(XO_4)_{3n}$$

wherein $M^{1+}$ is a metal cation having a +1 charge;

$M^{2+}$ is a metal cation having a +2 charge;

$M^{(2+n)}$ is a metal cation having a +3, +4 or +5 charge; and subscript n is a positive real number.

6. The compound of claim 1, having formula VI:

$$M^{2+}_{(4n-1)}M^{(2+n-b)}H_b(XO_4)_{3n}$$

wherein $M^{2+}$ is a metal cation having a +2 charge;
$M^{(2+n-b)}$ is a metal cation having a +3, +4 or +5 charge; and
subscript n is a positive real number.

7. A proton conducting membrane comprising a solid acid of Formula I:

$$M_{4a}H_b(XO_c)_{3a},$$

wherein M is at least one metal each independently a metal cation;
X is at least one member each independently selected from the group consisting of P, Si, As, Ge, S, Se, W, Cr and V; and
each of subscript a, b and c are independently a positive real number.

8. The proton conducting membrane of claim 7, further comprising a structural binder.

9. The proton conducting membrane of claim 8, wherein said structural binder is a member selected from the group consisting of carbon, polymer, ceramic, glass, semiconductor and metal.

10. The proton conducting membrane of claim 9, wherein said structural binder is electrically conducting.

11. The proton conducting membrane of claim 10, wherein said structural binder is a conducting polymer.

12. The proton conducting membrane of claim 10, wherein said structural binder is a metal.

13. The proton conducting membrane of claim 12, wherein said metal structural binder is mixed with a polymer.

14. The proton conducting membrane of claim 9, wherein said structural binder is silicon dioxide.

15. The proton conducting membrane of claim 14, wherein said structural binder is quartz.

16. The proton conducting membrane of claim 14, wherein said structural binder is fumed silica or colloidal silica.

17. The proton conducting membrane of claim 7, further comprising a separate conducting material.

18. The proton conducting membrane of claim 17, wherein said separate conducting material is ionically conductive.

19. The proton conducting membrane of claim 7, wherein said solid acid includes at least one variable valence element.

20. The proton conducting membrane of claim 7, being thermally stable at temperatures above about 100° C.

21. The proton conducting membrane of claim 7, having a proton conductivity of about $10^{-5}\ \Omega^{-1}\ cm^{-1}$ or higher at the temperature of use.

22. The proton conducting membrane of claim 7, conducting both protons and electrons.

23. A method of making a compound of Formula I:

$$M_{4a}H_b(XO_c)_{3a},$$

wherein M is at least one metal each independently a metal cation; X is at least one member each independently selected from the group consisting of P, Si, As, Ge, S, Se, W, Cr and V; each of subscript a, b and c are independently a positive real number;

comprising the steps of:

a) contacting said metal with a suitable oxyanion and a suitable hydrogen source;

b) conducting said method of making under appropriate reaction conditions so as to make a compound of Formula I.

24. The method of claim 23, further comprising the following step:

c) dissolving said metal in a suitable solvent in the presence of a chelating agent.

25. The method of claim 23, wherein the appropriate reaction conditions are above 500° C.

26. The method of claim 25, further comprising the steps of cooling and rehydrating.

27. The method of claim 23, wherein the appropriate reaction conditions involve a temperature greater than about 100° C. and a pressure greater than about 1 atm.

28. The method of claim 23, wherein the appropriate reaction conditions involve a temperature greater than about 300° C. and a pressure greater than about 10 atm.

* * * * *